Figure 1:
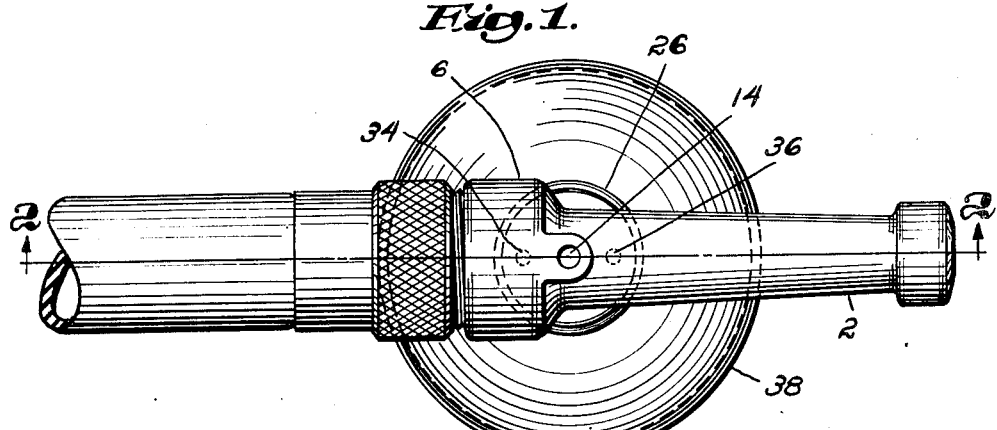

Feb. 27, 1951     H. W. McCABE     2,543,294

NOZZLE FOR MIXING LIQUIDS

Filed June 23, 1948

Inventor:
Harry W. McCabe
by C. Yardley Chittick
Attorney

Patented Feb. 27, 1951

2,543,294

UNITED STATES PATENT OFFICE 2,543,294

NOZZLE FOR MIXING LIQUIDS

Harry W. McCabe, Eastondale, Mass., assignor to
James E. Murley, Boston, Mass.

Application June 23, 1948, Serial No. 34,611

4 Claims. (Cl. 299—84)

This invention relates to nozzles, and is particularly concerned with a nozzle adapted to be attached to an ordinary garden hose, having means associated therewith for drawing into the stream of water a limited quantity of concentrated solution whereby the water and solution may be mixed automatically to be sprayed on on the desired area.

In recent years liquid fertilizers for grasses and plants have been developed. Ordinarily the fertilizer will be sold in such concentration that it cannot be applied directly to the vegetation. It therefore is necessary to dilute the liquid fertilizer to the proper degree before applying it. The conventional practice heretofore has been merely to dilute the concentrate in a large container and then, using a hand watering can, sprinkle it where desired. Another practice has been to dilute the concentrate in a large container and then place therein a tube leading to a suction device incorporated in the garden hose. When the water is turned on, the movement of water through the hose sucks up the diluted fertilizer, which then mixes with the water and is sprayed where wanted. The objection to this arrangement, however, is that whenever the hose is turned on the fertilizer will be sucked into the water stream. This is undesirable because the best practice indicates that it is preferable to water the vegetation before applying the fertilizer. Obviously, this cannot be done by the arrangement just described without first disconnecting the siphoning hose.

Accordingly, the present invention contemplates a nozzle construction adapted to be connected to the end of a hose, whereby the stream emitted from the nozzle may be changed at will from a stream that is pure water to a stream that is water mixed with a suitable quantity of the chemical fertilizer. In addition, the invention provides means whereby the fertilizer in its concentrated form may be mixed directly with the flowing stream, thereby eliminating the necessity of a preliminary dilution of the concentrate.

A further element of the invention is the detail of construction making it possible for the nozzle to be readily connected to or disconnected from a bottle containing the liquid fertilizer. The construction contemplates utilizing as part of the combination a cap of the same size and construction as the cap that normally closes the bottle when not in use.

The invention is in such form that it may be actuated as above described by anyone without special instruction or skill. The nature of the invention will be more clearly understood as the description proceeds with the aid of the accompanying drawings, in which Fig. 1 is a plan view of the nozzle shown attached to the hose and container.

Figure 2:
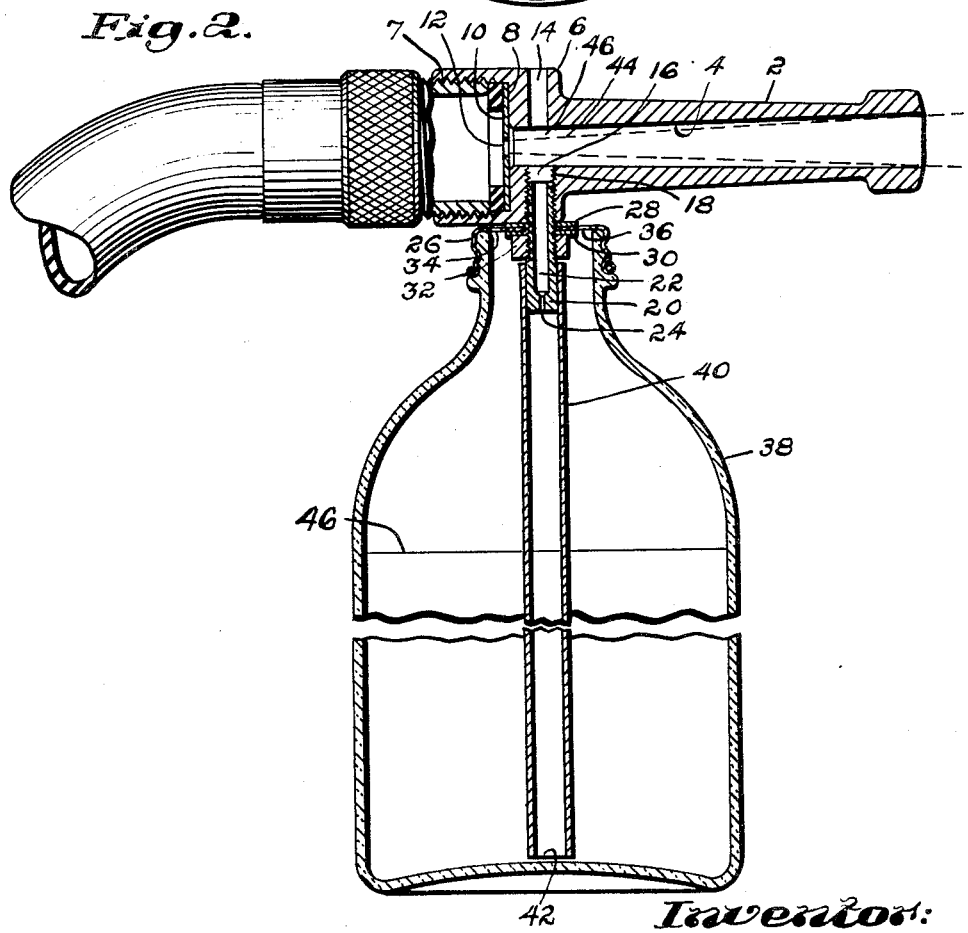

Fig. 2 is a vertical section on the line 2—2 of Fig. 1, except for the hose, which is shown in side elevation.

The invention comprises a nozzle 2 having an outwardly tapered bore 4 extending the full length thereof and forming a nozzle passage. The rear end of the nozzle is connected with an enlarged body portion 6 internally threaded at 7 for connection with a garden hose in the usual manner. The vertical wall 8 at the rear end of the nozzle acts as a seat against which is positioned a washer 10 having a centrally located hole which is in axial alignment with the axis of the nozzle. The hole 12, as can be seen in the drawing, is smaller than the rear end of the nozzle passage for purposes which will become more apparent hereinafter.

Through the body portion of the nozzle immediately forward of wall 8 is a vertically disposed hole 14 of substantial diameter. This hole leads from the exterior atmosphere to the rear of the nozzle passage, and under normal circumstances permits unimpeded flow of atmospheric air into the nozzle.

A corresponding hole 16 aligned for convenience with hole 14 extends downwardly from the bottom of the rear portion of the nozzle through the lower body portion. The interior of this hole 16 is threaded as at 18 to receive a jet member 20 which is correspondingly threaded at its upper end. The upper portion of the jet has a relatively large axial bore 22 leading to a small bore 24 which extends the remainder of the length of the jet member. The size of bore 24 as compared with hole 14 is small, so that when both are open it will be easier for air to flow to the nozzle passage through hole 14.

A typical screw threaded bottle cap 26 has a centrally located hole through the top thereof which permits the jet 20 to be passed therethrough. Between the top of the cap and the bottom of body 6 is placed a washer 28, and on the under side of the cap is placed a similar washer 30. The two washers and that portion of the cap therebetween are squeezed together and against the bottom of body 6 by a nut 32 which is screwed on to the lower portions of thread 18. The cap is perforated at 34 and 36 so that atmospheric air may pass freely through the cap into the bottle when the cap is screwed thereon.

With the parts thus assembled, the lower end of jet 20 will extend a short distance below the bottom rim of cap 26 where it may be conveniently reached to have positioned thereon a rubber tube 40. This tube will be long enough to reach to a point where its lower end 42 is close to the bottom of the jar 38 to which the cap 26 will be screwed when the nozzle is in use.

When the hose is turned on, water will flow through orifice 12 at high velocity forming initially a small diameter stream as at 44 which will leave an annular air space 46 thereabout at the rear end of the nozzle passage. The stream 44 immediately begins to expand and by the time it has reached the forward end of the nozzle passage it will have expanded sufficiently to develop the characteristics of a water piston, so that the air within the rear of the nozzle passage will be carried by the high velocity water to the outlet end of the nozzle and ejected therefrom. As the air in the annular area 46 is being continuously removed by the water stream, it is obvious that negative pressure would promptly develop, were not additional atmospheric air continuously supplied. Such atmospheric air is normally supplied through opening 14, and therefore as long as hole 14 is open the pressure in area 46 remains at or only slightly below atmospheric.

Up to this time the liquid being discharged from the nozzle is only water. When the operator desires to have the liquid fertilizer mixed with the water, all that is necessary is to place the thumb or finger over hole 14. This prevents any further entrance of atmospheric air to the annular space 46, and, as a result, negative pressure begins to develop. With the atmosphere pressing on the surface 46 of the fluid in jar 38 and with a negative pressure present in the bore 24 of jet member 20, it is obvious that the liquid level in tube 48 will commence to rise, and in due course, when the negative pressure in area 46 becomes sufficient, the concentrate will arrive in the nozzle through passage 16, where it will be picked up by the water to be discharged as a mixed solution.

The size of bore 24 and the negative pressure developed in area 46 control the rate of discharge of the fertilizer. These elements are so adjusted that the concentration of fertilizer in the discharged liquid will be correct for the purpose indicated.

If the operator desires to discontinue spraying the fertilizer, he merely removes his thumb or finger from hole 14, allowing atmospheric air to enter the annular area 46. This eliminates the negative pressure in bore 24, so that no more liquid is sucked into the water stream from jar 38.

Since water pressure varies in different localities, it is obvious that the velocity of stream 44 may vary. Accordingly, hole 14 has been designed to admit atmospheric air at a rate sufficient to keep the pressure in space 46 sufficiently close to atmospheric pressure to prevent any withdrawal of the fertilizer, regardless of the water pressure, so long as hole 14 is open.

Where the water pressure is high, it will occasionally be found that the suction created in bore 24 upon closing of hole 14 will be so great as to draw the liquid fertilizer into the nozzle in a continuous stream, thus causing over-concentration. In such case it will be found expedient to reduce the negative pressure in bore 24. This may be done by partial instead of complete blocking of hole 14.

For general use the following dimensions have been found satisfactory: hole 14 is .140 inch in diameter, bore 24 is .035 inch in diameter, and aperture 12 is .154 inch in diameter.

While a preferred form of the invention has been shown and described, it is to be understood that the invention is not to be limited thereby but only by the appended claims.

I claim:

1. A nozzle for use in the automatic mixing of a liquid with water normally flowing through said nozzle, said nozzle having a flaring nozzle passage, an aperture leading to an axially aligned with said nozzle passage and smaller than the nozzle passage whereby a stream of water entering said passage will not fill said passage adjacent said aperture, a port of substantial size leading through the wall of said nozzle to the rear end of said nozzle passage whereby atmospheric air may flow freely into said nozzle passage to prevent the development of a negative pressure therein, a second port leading to said rear end of said nozzle passage and of much smaller capacity than said atmospheric air port, means for connecting said nozzle to a liquid container, and tubular means capable of leading from said second port to a position below the level of liquid that may be in said container.

2. A nozzle for attachment to a garden hose comprising a flaring nozzle passage, an enlarged body portion at the rear end of said passage, a large internally threaded bore in said body portion axially aligned and connected with said passage, said large bore having an end wall, a disc positioned against said wall, a centrally located aperture in said disc axially aligned with said passage, said aperture smaller than the smallest part of said passage, a relatively large hole through said body leading to said passage near said disc, a relatively small hole leading to said passage near said disc, said small hole being formed in a jet member extending from said body, said large hole being of such size as to permit the flow of atmospheric air into said nozzle passage in such quantity that when water is flowing through said nozzle passage in maximum volume, the negative pressure developed in said passage will be insufficient to lift liquid through said small hole in said jet member into said passage, and a screw threaded cap carried by said jet member adapted to engage a correspondingly threaded portable container.

3. The combination of a nozzle and a portable liquid container, means for connecting said nozzle to a hose, means for producing a negative pressure area within said nozzle upon normal flow of water therethrough, a first opening connecting said negative pressure area with the atmosphere, said first opening being of such size that as long as it remains open the pressure in said negative pressure area will be only slightly below atmospheric and of negligible lifting power, a second smaller opening leading from said negative pressure area and terminating beneath the surface of the liquid in said container whereby upon closing of said first opening while water is flowing through said nozzle a greater negative pressure will be developed within said nozzle and said smaller opening which will be sufficient to draw liquid from said container into said nozzle to mix with the said flowing water.

4. A nozzle for attachment to a garden hose, said nozzle comprising a nozzle passage, means for connecting said nozzle to a hose, a separate member positioned between the rear end of said nozzle passage and said hose, said member having an aperture therethrough permitting a stream of water of less diameter than said nozzle passage to flow into said nozzle passage, thereby providing an annular air space at the rear of said nozzle passage, two ports leading to said air space, one port of large diameter to permit the maintenance of pressure only slightly below atmospheric in said air space so long as said one port is open and the other port of much less diameter so that upon the closing of said one port the negative pressure in said air space will increase, said second port formed by a tubular jet member exteriorly threaded and screwed into a corresponding interiorly threaded hole in the body of said nozzle, a threaded cap having a hole through its top surface, said jet member extending through said hole and having its lower end extending below the bottom rim of said cap, and a nut screwed on said jet member and positioned within the confines of the under side of said cap for maintaining said cap in tight fixed relation with said nozzle.

HARRY W. McCABE.

REFERENCES CITED

The following references are of record in the file of this patent:

UNITED STATES PATENTS

| Number | Name | Date |
|---|---|---|
| 1,769,266 | Lusier | July 1, 1930 |
| 1,920,721 | Tirrell | Aug. 1, 1933 |
| 2,050,522 | Evans et al. | Aug. 11, 1936 |
| 2,083,851 | Marcy | June 15, 1937 |
| 2,188,366 | Lindstaedt | Jan. 30, 1940 |
| 2,322,296 | Hunter | June 22, 1943 |
| 2,327,335 | Boerner et al. | Aug. 24, 1943 |
| 2,376,565 | Williams | May 22, 1945 |